(12) United States Patent
Saxon et al.

(10) Patent No.: US 7,207,593 B2
(45) Date of Patent: Apr. 24, 2007

(54) LIGHTWEIGHT REINFORCED TRACTOR-TRAILER SLIDER

(75) Inventors: Nancy L. Saxon, Oakland Township, MI (US); Braden Bromley, Royal Oak, MI (US); Steven R. Miller, Clarkston, MI (US); James Eckelberry, Canton, OH (US); Craig Holt, Chesterfield, MI (US); Steven G. Saieg, Sterling Heights, MI (US); Shaun Muston, Brownstown, MI (US); Jos Timmermans, Ortonville, MI (US); John Raymond Brink, Lake Orion, MI (US); Martin J. Watterson, Lebanon, PA (US)

(73) Assignee: ArvinMeritor Technology, LLC, Troy, MI (US)

( * ) Notice: Subject to any disclaimer, the term of this patent is extended or adjusted under 35 U.S.C. 154(b) by 435 days.

(21) Appl. No.: 10/806,035

(22) Filed: Mar. 22, 2004

(65) Prior Publication Data

US 2005/0205324 A1 Sep. 22, 2005

(51) Int. Cl.
*B60G 5/00* (2006.01)
(52) U.S. Cl. .................. 280/678; 280/683; 280/149.2; 280/789
(58) Field of Classification Search ............ 280/149.2, 280/789, 149.1, 407.1, 781, 676, 677, 678, 280/683, 405.1; 180/209, 24.02
See application file for complete search history.

(56) References Cited

U.S. PATENT DOCUMENTS

| | | | | |
|---|---|---|---|---|
| 5,088,758 A | * | 2/1992 | Wall et al. .................. | 280/683 |
| 5,354,091 A | * | 10/1994 | Baxter et al. ............... | 280/683 |
| 5,725,247 A | * | 3/1998 | Nilsson et al. .............. | 280/781 |
| 6,384,716 B1 | * | 5/2002 | Eckelberry .................. | 340/431 |
| 2003/0227165 A1 | * | 12/2003 | Herrmann et al. .......... | 280/781 |
| 2005/0051991 A1 | * | 3/2005 | Saxon et al. ............. | 280/149.2 |

* cited by examiner

Primary Examiner—Paul N. Dickson
Assistant Examiner—Tiffany L. Webb
(74) Attorney, Agent, or Firm—Carlson, Gaskey & Olds, PC

(57) ABSTRACT

A tractor-trailer slider includes spaced apart longitudinal side rails having control arm supports extending downwardly from the side rails for supporting the slider. Portions of the longitudinal side rails and the control arms supports are integrated using one or more common plates. Lightening holes and edge of the slider are flanged to reinforce the walls. Coining and ribbing are also used for additional reinforcement. Lateral cross-members extend between the longitudinal side rails. The lateral cross-members have tabs on opposing ends that are received in an interlocking relationship with complementary elongated slots in the longitudinal side rails. Air spring supports arranged at forward and rearward portions of the slider are secured to the longitudinal side rails, the control arm supports, and the lateral cross-members to provide a structurally rigid frame. The air spring supports provide spaced apart air spring mounting pads.

25 Claims, 5 Drawing Sheets

LIGHTWEIGHT REINFORCED TRACTOR-TRAILER SLIDER

BACKGROUND OF THE INVENTION

This invention relates to a tractor-trailer slider, and more particularly, the invention relates to a lightweight frame structure that increases the strength of the slider while reducing its weight.

Sliders are used in the trailer industry for repositioning a trailer suspension relative to a trailer frame to redistribute the load on the axles. To adjust the slider relative to the trailer, a pin locking system is actuated to move pins to an unlocked position. In a locked position, the pins selectively couple the slider to the trailer frame at a desired slider position. With the pins in the unlocked position, the trailer and the tractor are driven to reposition the trailer forward or rearward relative to the slider. The pins are subsequently moved to the locked position once the slider is positioned in the desired slider position.

Occasionally, the pins of the pin locking system do not fully engage the trailer frame. As a result, the slider may become decoupled from the trailer and move from the desired slider position during operation of the tractor-trailer. If no pins are engaged, and the trailer stops during operation, the slider may collide with the trailer causing damage to the trailer and/or slider. If only the pins on one side of the slider are engaged with the trailer frame, the slider may rack, or parallelogram, if the trailer is braked hard.

There is a need for a slider with improved structural rigidity, and in particular, a structure that better withstands racking, while avoiding an increase in the weight of the slider.

SUMMARY OF THE INVENTION AND ADVANTAGES

The inventive tractor-trailer slider includes spaced apart longitudinal side rails having control arm supports extending downwardly from the side rails for supporting a suspension. In one example of the invention, each of the control arms supports are provided by spaced apart inner and outer walls. In another aspect of the invention, a unitary plate forms a portion of the longitudinal side rails, for example, a longitudinal upper wall and side walls in addition to one of the inner and outer walls of the control arm supports. The inner and outer walls include a triangular lightening hole that has been flanged to reinforce the walls. The inner and outer walls may additionally include coining and/or ribbing for additional reinforcement. The additional reinforcement may be formed in proximity to upper and lower attachment points, which support upper and lower control arms connected to axles.

The inventive slider also includes lateral cross-members extending between side rails. The lateral cross-members have an inverted U-shape in one example. The lateral cross-members have tabs on opposing ends that are received in an interlocking relationship with complementary elongated slots in the longitudinal side rails. This interlocking relationship not only improves the structural rigidity of the slider, but also simplifies manufacturing of the slider by improved locating of the lateral cross-members relative to the longitudinal side rails during assembly and welding.

Air spring supports are arranged at forward and rearward portions of the slider and secured to the longitudinal side rails, the control arm supports, and the lateral cross-members to provide a structurally rigid frame. The air spring supports are generally L-shaped unitary plates that extend from a lower portion of the control arm supports to the lateral cross-members, and generally enclose an opening of the lateral cross-members formed by the inverted U-shape. A portion of a pin locking system, such as the pin linkages, is arranged within a space between the lateral cross-members and the air spring supports to provide protection and support for the pin locking system. The air spring supports provide spaced apart air spring mounting pads that support air springs arranged between the axles and the slider frame. Additional brackets and reinforcements are secured to the slider to provide additional structural rigidity.

Accordingly, the invention provides a lightweight slider having improved structural rigidity with an increased resistance to racking.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
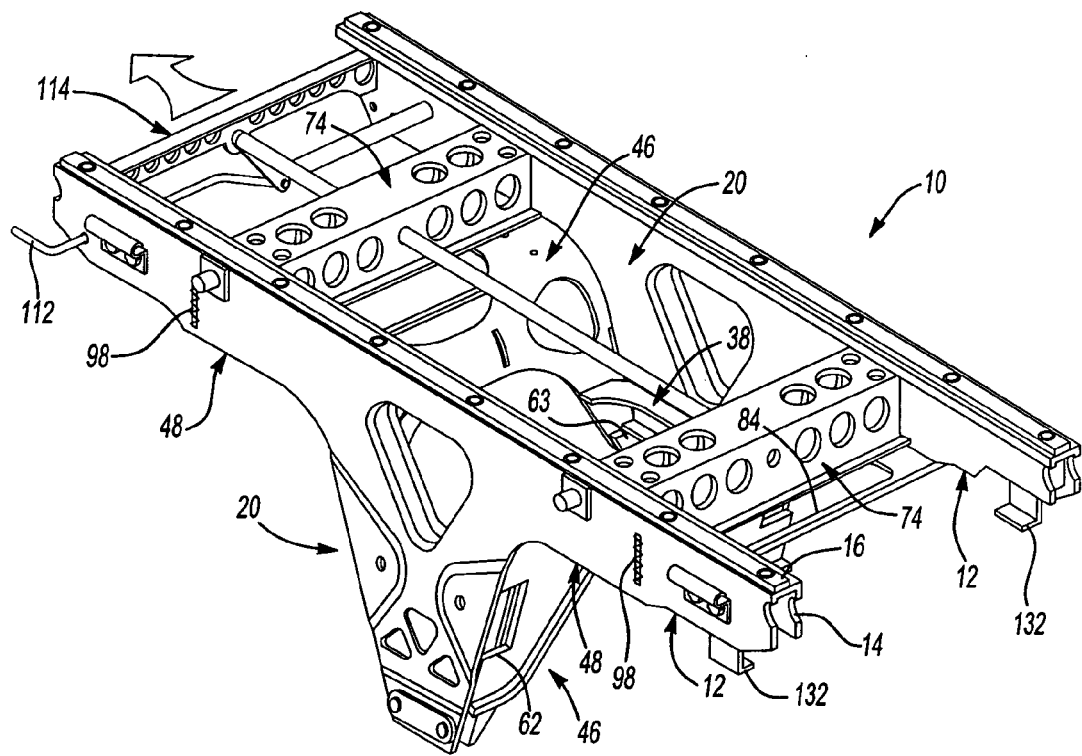
FIG. 1 is a top perspective view of the inventive slider with the suspension components removed for clarity.

A slider 10 according to the present invention is shown in FIGS. 1–8. FIGS. 1–7 illustrate the slider 10 with the suspension components removed for clarity. The slider 10 frame structure is preferably constructed from plate steel having mechanical properties specified by ASTM A715 with preferably a minimum yield strength of 76 KSI. However, one of ordinary skill in the art would understand that other types of steels may be used and that the steel thickness may vary throughout the frame structure depending upon the loads exerted, the locations of loads, and the overall stiffness desired for the slider 10. Furthermore, the plates of steel are preferably secured together by welding at intersections between the plates on at least one side of the intersection. Most of the weld beads are not shown for clarity.

Referring to FIGS. 1–5, the slider 10 includes spaced apart longitudinal side rails 12. The internal structure can be understood from exploded view FIG. 2. The longitudinal side rails 12 include an upper longitudinal wall 14 having an anti-friction member 16 secured to the upper longitudinal wall 14 for reducing the friction between the slider 10 and the trailer (not shown) supported on the slider 10. The longitudinal side rails 12 have longitudinal side walls 18 spaced from one another and depending downwardly from the upper longitudinal wall 14. Control arm supports 20 extend downwardly from the longitudinal side rails 12 and are used to support suspension components such as control arms, which will be discussed relative to FIG. 8 below.

Control arm supports 20 each include spaced apart inner 22 and outer 24 walls. To improve the structural rigidity of the longitudinal side rails 12 and the control arm supports 20, portions of the longitudinal side rails 12 and control arm supports 20 may be integrated with one another so as to use one or more common unitary plates. For example, a first unitary plate provides the upper longitudinal wall 14, a longitudinal side wall 18, and the outer wall 24. A second unitary plate provides the other longitudinal side wall 18 and the inner wall 22 and is secured to the first plate by a weld bead. In this manner, many of the separate prior art members that must be welded to one another are eliminated, reducing the number of welds and consequent areas of reduced rigidity. Of course, it should be understood that the longitudinal side rails 12 may also provide both the inner 22 and outer 24 walls using a single unitary plate bent to provide the longitudinal side rail 12 and control arm support 20 structures shown in the Figures. Rearward positions of the longitudinal side rails 12 have rear reinforcing brackets 59 secured thereto for stiffening, if desired, or they may be omitted to provide a crumple zone.

Figure 2:
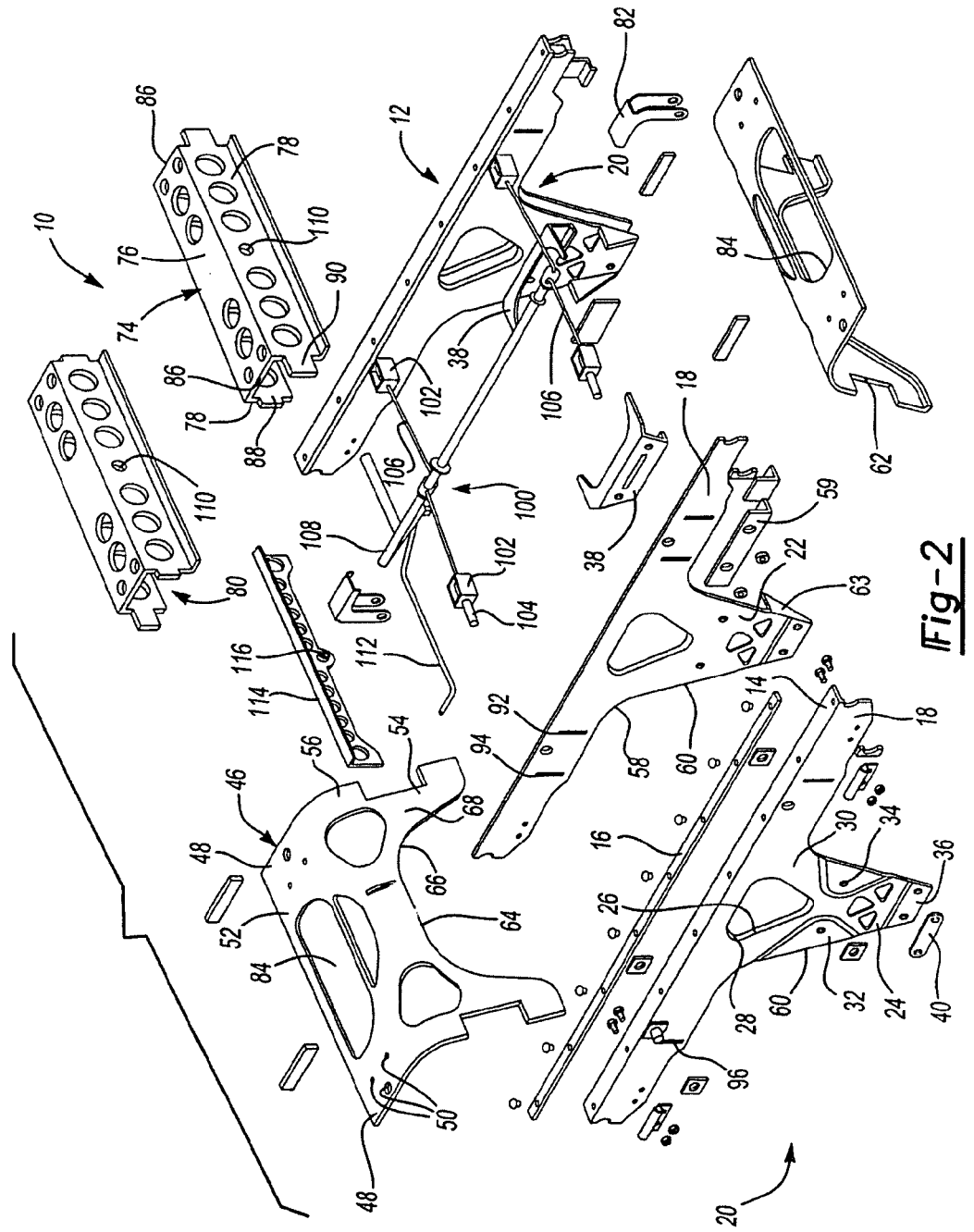
FIG. 2 is an exploded top perspective view of the inventive slider shown in FIG. 1.
Figure 4:
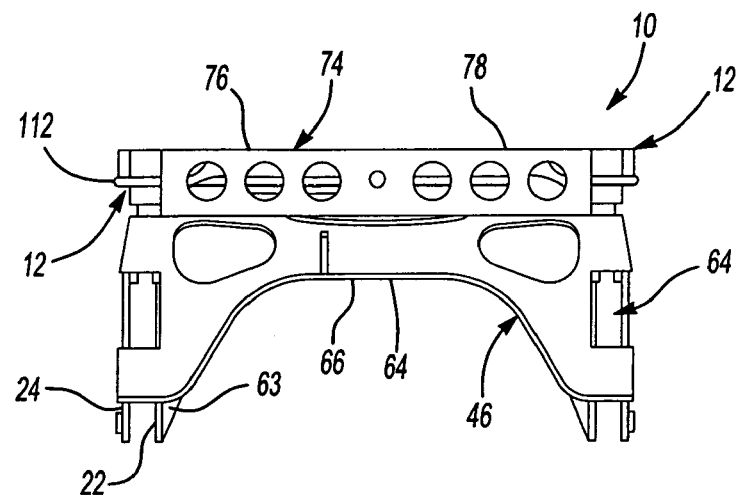
FIG. 4 is an end elevation view of the inventive slider shown in FIG. 1.
Figure 5:
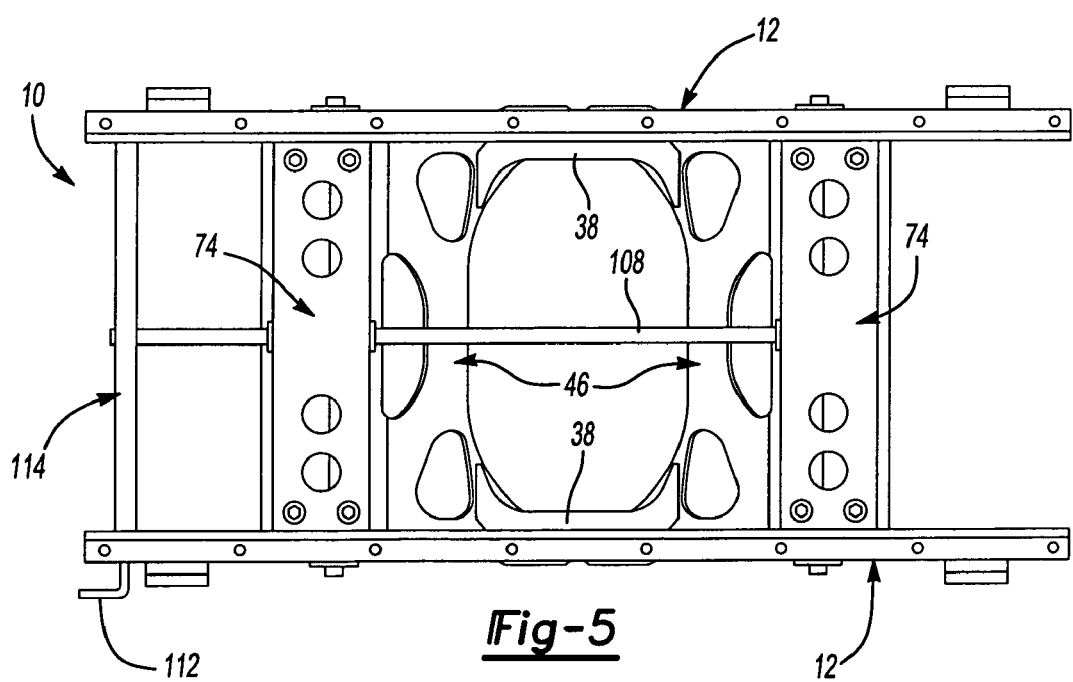
FIG. 5 is a top elevation view of the inventive slider shown in FIG. 1.

The control arm supports 20 are further stiffened by flanging a lightening hole 26. More specifically, a flange 28 at the hole edge is deformed to be transverse, for example at a right angle, to an adjacent surface 30 surrounding the lightening hole 26. Similarly, portions of the control arm supports 20 are deformed. More specifically, portions of the control arm supports 20 are deformed to provide a proud surface 32 as deformed outwardly from the surrounding adjacent surface 30. As best shown in FIG. 2, the proud surfaces 32 can be used in proximity to upper 34 and lower 36 attachment points, to which control arms are secured, for additional reinforcement of those regions.

Figure 6:
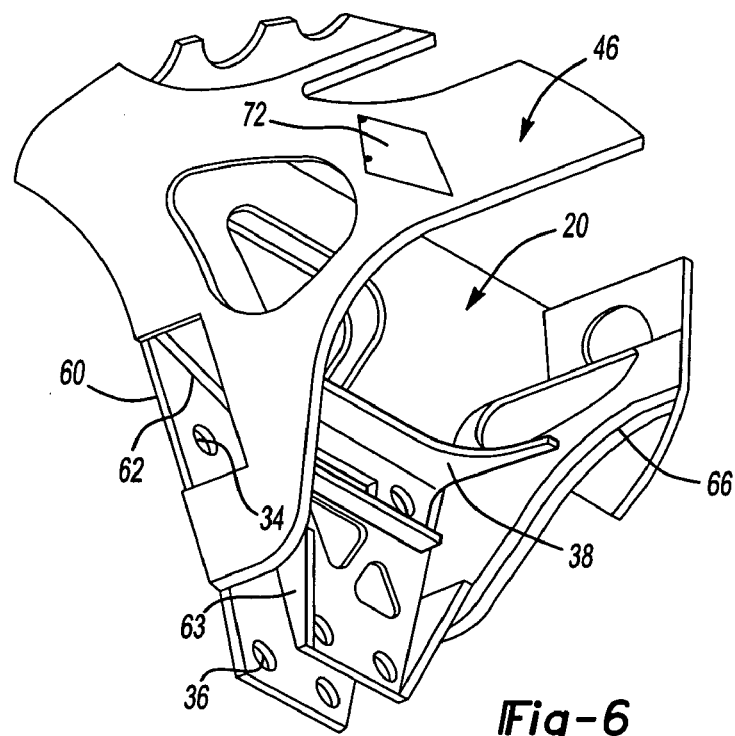
FIG. 6 is partial bottom perspective view of a control arm support of the inventive slider shown in FIG. 1.
Figure 7:
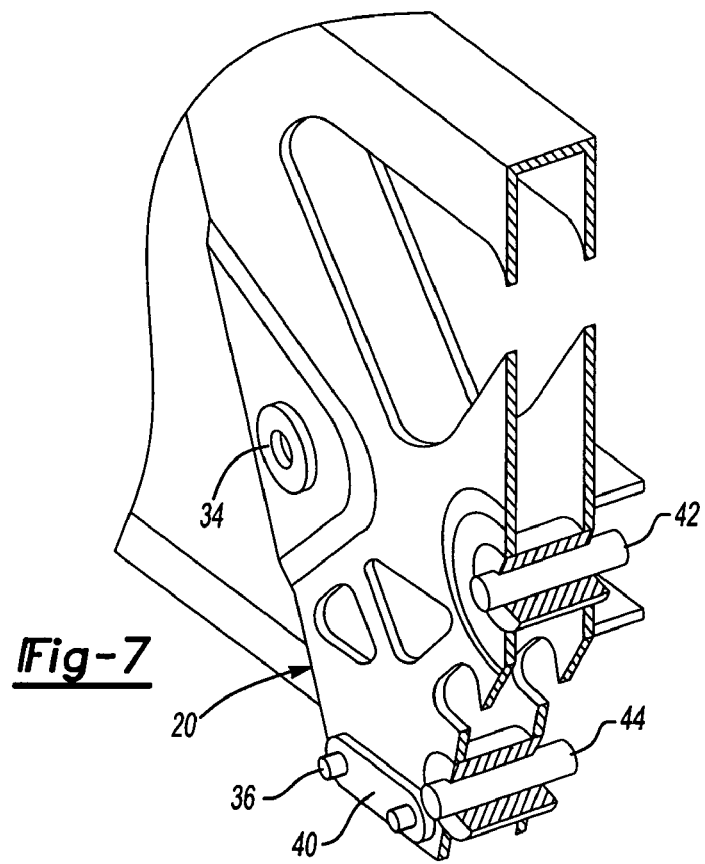
FIG. 7 is a cross-sectional top perspective view of the control arm support of the inventive slider taken along line 7—7 in FIG. 3.

The areas of the attachment points 34 and 36 are further reinforced by utilizing upper 38 and lower 40 reinforcing brackets. The upper reinforcing bracket 38 is arranged adjacent to the inner wall 22 and bridges the upper attachment points 34, which is best shown in FIGS. 2 and 6, acting as a control arm support stiffening bracket resisting racking. Upper bushings 42, shown in FIG. 7, are arranged between the inner 22 and outer 24 walls to maintain the spacing inbetween the walls 22 and 24. Fasteners are received in the upper attachment points 34 through the upper bushings 42 and the upper reinforcing bracket 38, which is welded in place, to secure the upper control arms to the control arm supports 20. Similarly, lower bushings 44 are arranged between the inner 22 and outer 24 walls, and fasteners are received by the lower attachment points 36 through the lower bushings 44 and the lower reinforcing bracket 40, which is welded in place, to secure the lower control arms to the control arm supports 20.

Generally L-shaped air spring supports 46 are secured to the slider 10 at forward and rearward portions. The air spring supports 46 provide spaced apart air spring mounting pads 48 having apertures 50 used to secure air springs to the air spring mounting pads 48. The air spring supports 46 include a generally horizontal wall 52 extending to a downwardly depending wall 54, with a curved wall 56 adjoining the horizontal wall 52 and downwardly depending wall 54. The air spring supports 46 extend laterally between the control arm supports 20 on either side of the slider 10.

Lateral cross-members 74 extend between the longitudinal side rails 12. The air spring supports 46 are secured to the longitudinal side rails 12, the lateral cross-member 74, and the control arm supports 20. The longitudinal side rails 12 and control arm supports 20 form curved edges 58 to which the curved wall 56 of the air spring supports 46 are secured. The inner 22 and outer 24 walls provide edges 60 to which the downwardly depending wall 54 is secured. The downwardly depending wall 54 may include openings 62. Control arms are received in the opening 62 so that the control arms can be secured to the upper attachment points 34.

The inner walls 22 include a flange 63 extending inwardly that is secured to the air spring supports 46 to provide additional rigidity to the lower portion of the control arm supports 20. The upper reinforcing bracket 38 is secured to the forward and rearward air spring supports 46.

Figure 3:
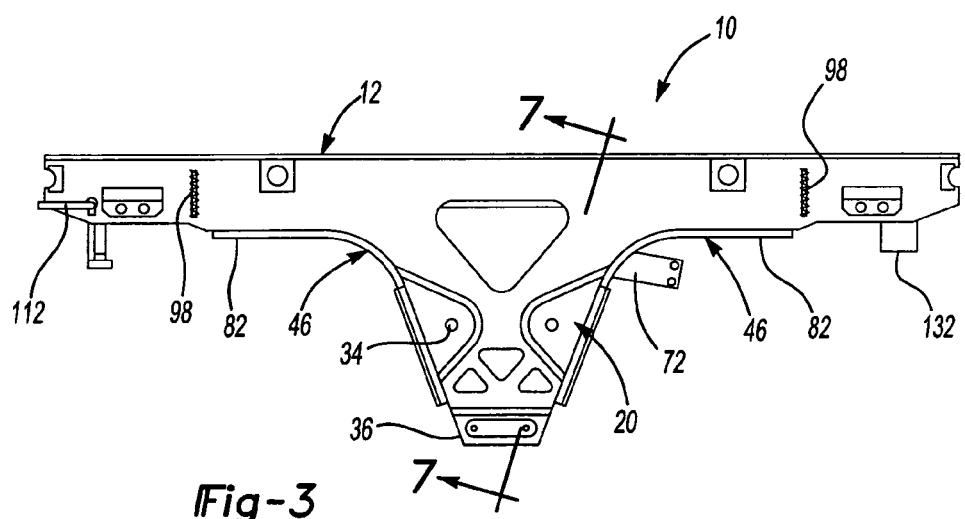
FIG. 3 is a side elevation view of the inventive slider shown in FIG. 1.

The air spring supports 46 include a lower edge 64 having a flange 66 arranged transverse, for example at a right angle, to a surrounding adjacent surface 68. As shown in FIG. 3, one of the air spring supports 46 includes an elongated slot for receiving a ride height control valve bracket 72.

The lateral cross-members 74 each include an upper wall 76 and spaced apart lateral walls 78 providing an inverted U-shaped structure. The inverted U-shape structure of the lateral cross-members 74 provide an opening 80 which is generally enclosed by the horizontal walls 52 of the air spring supports 46. Air spring supports 46 include openings 84. Shock brackets 82 are secured to a lower surface of the upper wall 76. The opening 84 enables a shock absorber to extend through the opening 84 for securing the shock absorber to the shock brackets 82.

The lateral cross-members 74 have opposing ends 86 that are positioned relative to the longitudinal side rails 12 with locating features. Each of the opposing ends include protrusions or short tabs 88 and long tabs 90 received in interlocking relationship with a complementary feature, such as a notch, in the longitudinal side rails 12 to provide one example of locating features. Specifically, an inside longitudinal side wall 18 includes first 92 and second 94 elongated slots. An outside longitudinal side wall 18 includes a third elongated slot 96. The short tab 88 extends through the first elongated slot. The long tab 90 extends through the second 94 and third 96 elongated slots. A weld bead 98 is arranged on the outer longitudinal side wall 18 in the area of the third elongated slot 96, shown in FIGS. 1, 3 and 8, to secure the lateral cross-member 74 to the longitudinal side rails 12 at the long tab 90 where it extends through the outer longitudinal side wall 18. The interlocking relationship provides additional structural rigidity and resistance to racking. Furthermore, the interlocking relationship simplifies manufacturing by enabling the longitudinal side rails 12 and lateral cross-members 74 to be located during assembly and subsequent welding.

The slider 10 includes a pin locking system 100. Pin cages 102 are secured to the inside longitudinal side wall 18 for supporting pins 104. Linkages 106 couple opposing pins 104. An actuator rod 108 couples forward and rearward linkages 106 to one another. Holes 110 in the lateral cross-members 74 support the actuator rod 108 for rotation. A handle 112 is connected to the actuator rod 108 for manual rotational manipulation of the actuator rod 108 to move the pins 104 from an engaged or locked position to an unlocked position, as is well known in the art. An actuator rod support 114 having a hole 116 may provide additional support for the actuator rod 108. This is valuable when the pin locking system 100 includes an arrangement in which the handle 112 is located in a forward portion of the slider 10, as opposed to a location between the lateral cross-members 74. The actuator rod support 114 provides additional protection to the pin locking system 100 in the event of a collision between the slider 10 and trailer supported on the slider 10.

Figure 8:
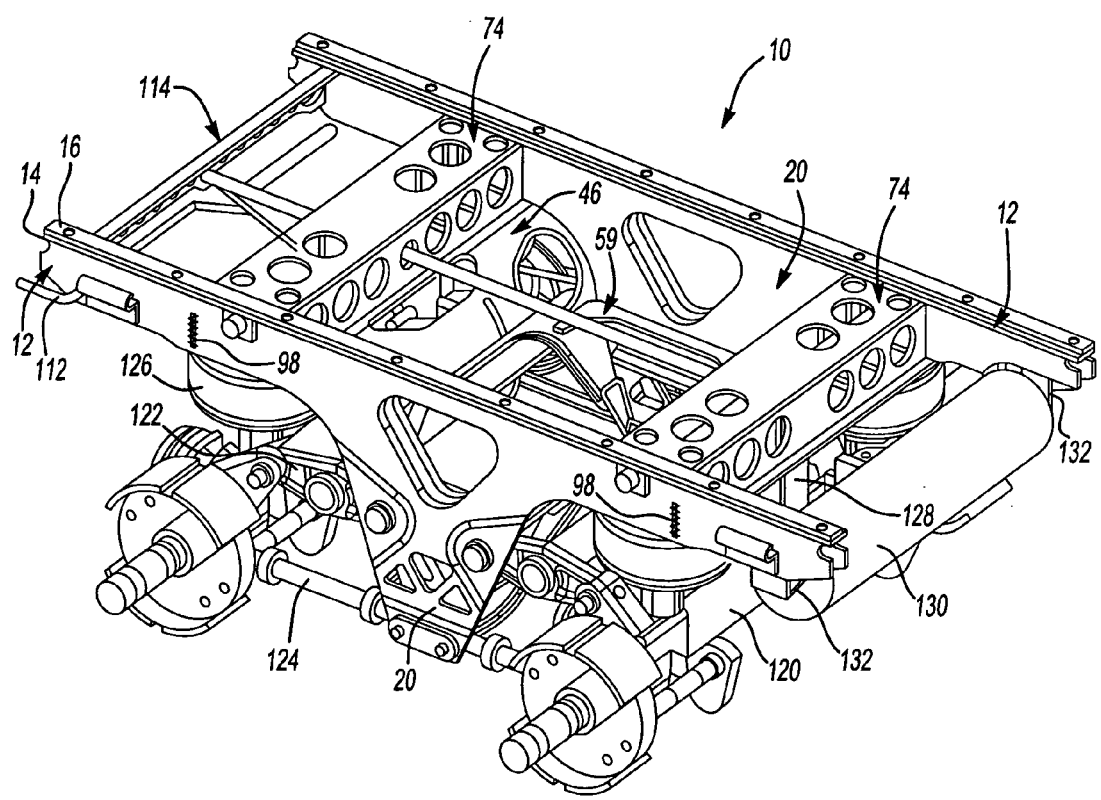
FIG. 8 is a top perspective view of the inventive slider shown in FIG. 1 having suspension components connected to the slider.

Referring to FIG. 8, suspension components are shown supported on the inventive slider 10. Axles 120 are secured to the slider 10 frame structure by upper 122 and lower 124 control arms that are secured respectively to the upper 34 and lower 36 attachment points, shown in FIG. 3. Air springs 126 are arranged between the axles 120 and the air spring mounting pads 48 provided by the air spring supports 46. Shock absorbers 128 are arranged between the axles 120 and the shock brackets 82. An air tank 130 is supported at a rearward portion of the slider 10 by air tank support brackets 132 secured to the longitudinal side rails 12.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A tractor-trailer slider comprising:
spaced apart longitudinal side rails including control arm supports extending downwardly from the longitudinal side rails, the longitudinal side rails having generally parallel portions and the control arm supports having sides;
at least one lateral cross-member interconnecting the longitudinal side rails; and
at least one air spring support member providing a pair of spaced apart air spring mounting pads, the at least one air spring support member secured to each of the sides of the control arm supports, the generally parallel portions of the longitudinal side rails, and the lateral cross-member.

2. The tractor-trailer slider according to claim 1, wherein the longitudinal side rails have forward and rearward portions and the control arm supports have forward and rearward sides, and the at least one lateral cross-member comprising forward and rearward lateral cross-members interconnecting the longitudinal side rails, and the at least one air spring support member comprising forward and rearward air spring support members, the forward and rearward air spring support members each providing a pair of spaced apart air spring mounting pads, the forward and rearward air spring support members each respectively secured to the forward and rearward sides of the control arm supports, the forward and rearward portions of the longitudinal side rails, and a respective one of the forward and rearward lateral cross-members.

3. The tractor-trailer slider according to claim 2, wherein an intersection of the forward and rearward portions of the longitudinal side rails and the forward and rearward sides of the control arm supports form curved edges, the forward and rearward air spring support members extending generally horizontally from the forward and rearward portions of the longitudinal side rails downwardly to the forward and rearward sides of the control arm supports with the air spring supports secured to the curved edges.

4. The tractor-trailer slider according to claim 3, wherein each longitudinal side rail and each control arm support includes spaced apart walls, the spaced apart walls providing the curved edges.

5. The tractor-trailer slider according to claim 4, wherein the control arm supports include a control arm attachment point, the air spring support members having an access opening proximate to the control arm attachment point providing access to a space between the spaced apart walls near the control arm attachment point.

6. The tractor-trailer slider according to claim 5, wherein the air spring support members bridge the spaced apart walls on opposing sides of the opening.

7. The tractor-trailer slider according to claim 2, wherein a control arm support stiffening bracket is arranged adjacent to each of the control arm supports and extending between the forward and rearward air spring support members, the control arm support stiffening bracket secured to the control arm supports and the air spring support members.

8. The tractor-trailer slider according to claim 7, wherein fasteners extend through said control arm support stiffening brackets and the control arm supports at a control arm attachment point.

9. The tractor-trailer slider according to claim 1, wherein the lateral cross-member is an inverted U-shaped member having spaced apart lateral walls providing a downwardly facing opening, the air spring support member bridging the spaced apart lateral walls and secured to at least one of the spaced apart lateral walls, providing a box-shaped structure with the lateral cross-member.

10. The tractor-trailer slider according to claim 9, wherein a linkage of a pin locking system is arranged within the downwardly facing opening of the lateral cross-member and bounded by the lateral walls of the lateral cross member and the air spring support member.

11. The tractor-trailer slider according to claim 1, wherein the air spring support member includes a laterally extending edge arranged transverse to an adjacent surface of the air spring support member, providing a reinforcing flange stiffening the adjacent surface.

12. A tractor-trailer slider comprising: spaced apart longitudinal side rails with at least one of the longitudinal side rails including a first locating feature; and
a lateral cross-member interconnecting the longitudinal side rails, the lateral cross-member including a second locating feature interlocking with the first locating feature, one of the locating features being a notch and the other of the locating features being a protrusion received within the notch.

13. The tractor-trailer slider according to claim 12, further comprising control arm supports extending downwardly from the longitudinal side rails, and an air spring support member providing a pair of spaced apart air spring mounting pads, the air spring support member secured to the control arm supports, the longitudinal side rails, and the lateral cross-member.

14. The tractor-trailer slider according to claim 12, wherein the notch is an elongated slot in a surface of the at least one of the longitudinal side rails and the protrusion is a tab extending from a wall of the lateral cross-member.

15. The tractor-trailer slider according to claim 14, wherein each of the longitudinal side rails include an elongated slot, and the lateral cross member includes opposing ends with each of the ends including a tab extending through the elongated slot of each of the longitudinal side rails, and comprising a weld bead securing the tab to the longitudinal side rail in the area of the elongated slot.

16. The tractor-trailer slider according to claim 15, wherein each end of the lateral cross member includes a short tab and a long tab, the longitudinal side rails including opposing first and second walls with the first wall including first and second elongated slots with the short and long tabs respectively extending through the first and second elongated slots, and the second wall including a third slot with the long tab extending from the second elongated slot to the third elongated slot.

17. The tractor-trailer slider according to claim 12, wherein the lateral cross-member substantially encloses a linkage of a pin locking system.

18. A tractor-trailer slider comprising: spaced apart longitudinal side rails each including control arm supports extending downwardly from the longitudinal side rails, each of the longitudinal side rails including an upper longitudinal wall and a pair of spaced apart longitudinal side walls, each of the control arm supports including an inner and outer wall;
  a unitary first plate providing one of the inner and outer walls, one of the longitudinal side walls and the upper longitudinal wall of each longitudinal side rail and control arm support; and
  a lateral cross-member interconnecting the longitudinal side rails.

19. The tractor-trailer slider according to claim 18, comprising an air spring support member providing a pair of spaced apart air spring mounting pads, the air spring support member secured to edges of the control arm supports, the longitudinal side walls, and the lateral cross-member.

20. The tractor-trailer slider according to claim 18, wherein a unitary second plate is secured to the first plate by a weld bead, the second plate providing the other of the inner and outer walls and the longitudinal side walls.

21. The tractor-trailer slider according to claim 18, wherein upper and lower bushings are arranged between the inner and outer walls respectively providing upper and lower control arm attachment points.

22. The tractor-trailer slider according to claim 21, comprising a reinforcement bracket arranged adjacent to an outer surface of the inner wall with a fastener extending through one of the bushings securing the reinforcement bracket to the control arm support.

23. The tractor-trailer slider according to claim 18, wherein one of the inner and outer walls include a lightening hole having an edge arranged transverse to an adjacent surface of the one of the walls providing a reinforcing flange stiffening the adjacent surface.

24. The tractor-trailer slider according to claim 18, wherein one of the inner and outer walls provides upper and lower control arm attachment points, the one of the walls includes a deformed area arranged proximate to one of the upper and lower control arm attachment points providing a proud surface spaced from an adjacent surface from the proud surface.

25. The tractor-trailer slider according to claim 18, wherein a rear reinforcing bracket is secured to each of the longitudinal side rails at a rearward portion of the longitudinal side rails.

* * * * *